(12) United States Patent
Naito et al.

(10) Patent No.: US 12,583,151 B2
(45) Date of Patent: Mar. 24, 2026

(54) GAS SUPPLY DEVICE, INJECTION MOLDING MACHINE, AND FOAM MOLDING METHOD

(71) Applicant: THE JAPAN STEEL WORKS, LTD., Tokyo (JP)

(72) Inventors: Akihiro Naito, Tokyo (JP); Takuya Yufu, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 174 days.

(21) Appl. No.: 18/038,912

(22) PCT Filed: Nov. 17, 2021

(86) PCT No.: PCT/JP2021/042339
§ 371 (c)(1),
(2) Date: May 25, 2023

(87) PCT Pub. No.: WO2022/118662
PCT Pub. Date: Jun. 9, 2022

(65) Prior Publication Data
US 2024/0017452 A1      Jan. 18, 2024

(30) Foreign Application Priority Data
Dec. 4, 2020      (JP) ................................. 2020-201506

(51) Int. Cl.
B29C 44/42          (2006.01)
B29C 33/20          (2006.01)
(Continued)

(52) U.S. Cl.
CPC ............ B29C 44/424 (2013.01); B29C 33/20 (2013.01); B29C 44/3415 (2013.01);
(Continued)

(58) Field of Classification Search
CPC . B29C 33/20; B29C 44/3415; B29C 44/3446; B29C 44/3449; B29C 44/35;
(Continued)

(56) References Cited

U.S. PATENT DOCUMENTS 6,949,208 B1 *   9/2005   Kawauchi ........... B29C 44/3446
                                                                    425/207
2005/0142245 A1   6/2005   Chen et al.
(Continued)

FOREIGN PATENT DOCUMENTS

JP           2002-67116 A       3/2002
JP           2003-39473 A       2/2003
(Continued)

OTHER PUBLICATIONS

WO2020/184486_ Machine Translation (Year: 2020).*
(Continued)

*Primary Examiner* — Yunju Kim
(74) *Attorney, Agent, or Firm* — Sughrue Mion, PLLC

(57)          ABSTRACT

An injection device (2) of an injection molding machine (1) includes a heating cylinder (18) having a gas introduction port (30) and a screw (19), and a gas supply device (5) is connected to the gas introduction port (30). The gas supply device (5) includes a gas supply source (33) and a gas pressure regulating unit (34). The gas pressure regulating unit (34) regulates a gas pressure and supplies the gas when a gas from the gas supply source (33) is introduced into the gas introduction port (30). Specifically, the gas pressure is caused to change in a molding cycle and is increased to a high pressure in a metering process (61). That is, a pressure increasing period (71) in which the gas pressure increases at least partially overlaps with the metering process (61).

20 Claims, 7 Drawing Sheets

(51) Int. Cl.

| | |
|---|---|
| *B29C 44/34* | (2006.01) |
| *B29C 44/60* | (2006.01) |
| *B29C 45/17* | (2006.01) |
| *B29C 45/66* | (2006.01) |
| *B29C 45/74* | (2006.01) |
| *B29C 45/76* | (2006.01) |
| *B29K 105/04* | (2006.01) |

(52) U.S. Cl.
CPC ............ *B29C 44/422* (2013.01); *B29C 44/60* (2013.01); *B29C 45/66* (2013.01); *B29C 45/74* (2013.01); *B29C 45/76* (2013.01); *B29C 2045/1784* (2013.01); *B29C 2945/76498* (2013.01); *B29C 2945/76668* (2013.01); *B29K 2105/04* (2013.01)

(58) Field of Classification Search
CPC ..... B29C 44/42; B29C 44/422; B29C 44/424; B29C 44/58; B29C 44/60; B29C 45/0001; B29C 45/03; B29C 45/17; B29C 45/46; B29C 45/47; B29C 45/64; B29C 45/66; B29C 45/74; B29C 45/76; B29C 45/77; B29C 2045/1702; B29C 2045/1784; B29C 2045/468; B29C 2945/76498; B29C 2945/76668; B29K 2105/04
See application file for complete search history.

(56) References Cited

U.S. PATENT DOCUMENTS

| | | | |
|---|---|---|---|
| 2015/0336307 A1* | 11/2015 | Yamamoto ............ | B29C 44/422 264/40.4 |
| 2019/0118432 A1 | 4/2019 | Burnham et al. | |
| 2022/0126494 A1 | 4/2022 | Naito et al. | |

FOREIGN PATENT DOCUMENTS

| | | |
|---|---|---|
| JP | 2019-18522 A | 2/2019 |
| JP | 2020-110991 A | 7/2020 |
| TW | 200520933 A | 7/2005 |
| WO | 2020/184486 A1 | 9/2020 |

OTHER PUBLICATIONS

International Search Report (PCT/ISA/210) issued by the International Searching Authority on Jan. 11, 2022 in corresponding International Application No. PCT/JP2021/042339.
Written Opinion (PCT/ISA/237) issued by the International Searching Authority on Jan. 11, 2022 in corresponding International Application No. PCT/JP2021/042339.
Office Action issued on May 9, 2025 by the Taiwanese Patent Office in corresponding TW Patent Application No. 110145126.
Office Action issued on May 9, 2025 by the Taiwanese Patent Office in corresponding TW Patent Application No. 110145216.

* cited by examiner

TIME

GAS SUPPLY DEVICE, INJECTION MOLDING MACHINE, AND FOAM MOLDING METHOD

CROSS REFERENCE TO RELATED APPLICATIONS

This application is a National Stage of International Application No. PCT/JP2021/042339 filed on Nov. 17, 2021 claiming priority from Japanese Patent Application No. 2020-201506 filed on Dec. 4, 2020, the disclosures of which are incorporated herein in their entirety by reference.

TECHNICAL FIELD

The present invention relates to a gas supply device for supplying a gas in an injection molding machine that injects a gas such as carbon dioxide, nitrogen, argon, helium, air, or a hydrocarbon such as methane or butane into an injection material to mold a foam molded product, an injection molding machine equipped with the gas supply device, and a foam molding method.

BACKGROUND ART

A foam molding method for obtaining a foam molded product using a physical foaming agent, that is, a high pressure gas, is carried out by an injection molding machine equipped with a gas supply device. An injection molding machine includes a heating cylinder and a screw, as described in PTL 1, for example. An inside of the heating cylinder is partitioned into a plurality of sections according to a shape of the screw. That is, the heating cylinder includes a first compression section, a starvation section, and a second compression section from upstream to downstream. The heating cylinder has a gas introduction port corresponding to the starvation section. The gas supply device is connected to the gas introduction port.

A resin is fed from upstream to downstream in the heating cylinder by the screw, melted, and kneaded in the first compression section. Then, a pressure of the resin decreases in the starvation section. A gas supplied from the gas supply device is introduced into the starvation section via the gas introduction port. The resin into which the gas is injected is kneaded and compressed in the second compression section, and the gas is dissolved in the resin. Such a resin is fed to a distal end of the screw and is metered. The screw is driven to inject the resin into a mold. The gas dissolved in the resin is foamed in the mold to obtain a foam molded product.

CITATION LIST

Patent Literature

PTL 1: JP2020-110991A

SUMMARY OF INVENTION

Technical Problem

When the foam molding method is carried out, a sufficient amount of gas is preferably dissolved in the resin. This is because when the resin in which the gas is sufficiently dissolved is injected, the number of bubbles generated in the mold increases, and a foam molded product having dense and fine bubbles and high quality is obtained. In order to efficiently dissolve a sufficient amount of gas in the resin, it is necessary to introduce a relatively high pressure gas from the gas introduction port. However, when the gas is supplied at a high pressure, there is a problem that a seal of the resin in the first compression section may be broken and backflow in which the gas leaks from upstream of the heating cylinder may easily occur.

The present disclosure provides a gas supply device, an injection molding machine, and a foam molding method in which a sufficient amount of gas is efficiently dissolved in a resin in foam molding and the backflow of the gas hardly occurs.

Other problems and novel features will become apparent from description of the present description and the accompanying drawings.

Solution to Problem

The present disclosure is directed to a gas supply device provided in an injection molding machine for foam molding. An injection device of an injection molding machine includes a heating cylinder having a gas introduction port and a screw, and the gas supply device is connected to the gas introduction port. The gas supply device includes a gas supply source and a gas pressure regulating unit. The gas pressure regulating unit is configured to regulate a gas pressure and supply the gas when a gas from the gas supply source is introduced into the gas introduction port. The gas pressure regulating unit is configured to change the gas pressure in a molding cycle, and a pressure increasing period in which the gas pressure increases at least partially overlaps with a metering process.

Advantageous Effects of Invention

According to the present disclosure, the gas pressure is changed by the gas pressure regulating unit of the gas supply device, and the pressure increasing period in which the gas pressure increases overlaps the metering process. Accordingly, when the resin is fed from upstream to downstream in the metering process, the high pressure gas is supplied to the resin, and thus the gas is efficiently dissolved in the resin. At this time, since the resin flows from upstream to downstream, it is possible to obtain an effect that the backflow of the gas hardly occurs.

3

Figure 8:
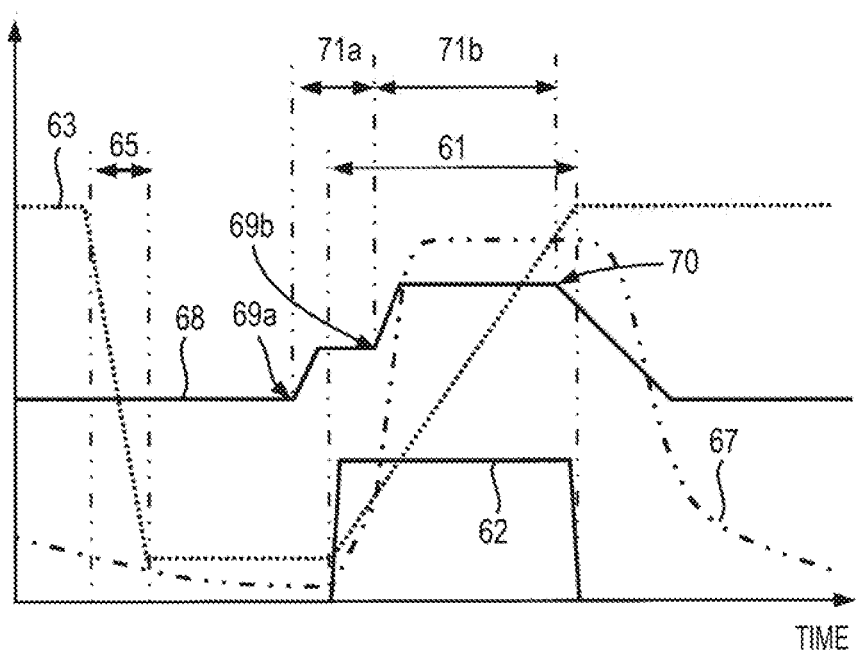

FIG. 8 is a graph showing changes in a gas pressure, a screw rotation speed, a screw position, and a gas requirement in a molding cycle when a foam molding method according to another embodiment is carried out.

Figure 9:
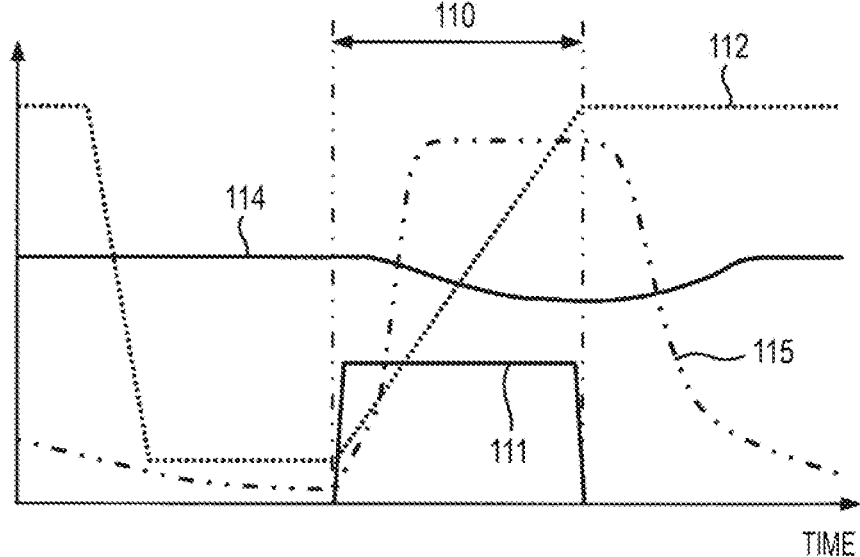

FIG. 9 is a graph showing changes in a gas pressure, a screw rotation speed, a screw position, and a gas requirement in a molding cycle when a foam molding method of the related art is carried out.

DESCRIPTION OF EMBODIMENTS

Hereinafter, specific embodiments will be described in detail with reference to the drawings. The present disclosure is not limited to the following embodiments. In order to clarify the description, the following description and the drawings are simplified as appropriate. In the drawings, the same elements are denoted by the same reference numerals, and repeated description thereof is omitted as necessary. Further, hatching may be omitted so as not to complicate the drawings.

The present embodiment will be described.
<Injection Molding Machine>

Figure 1:
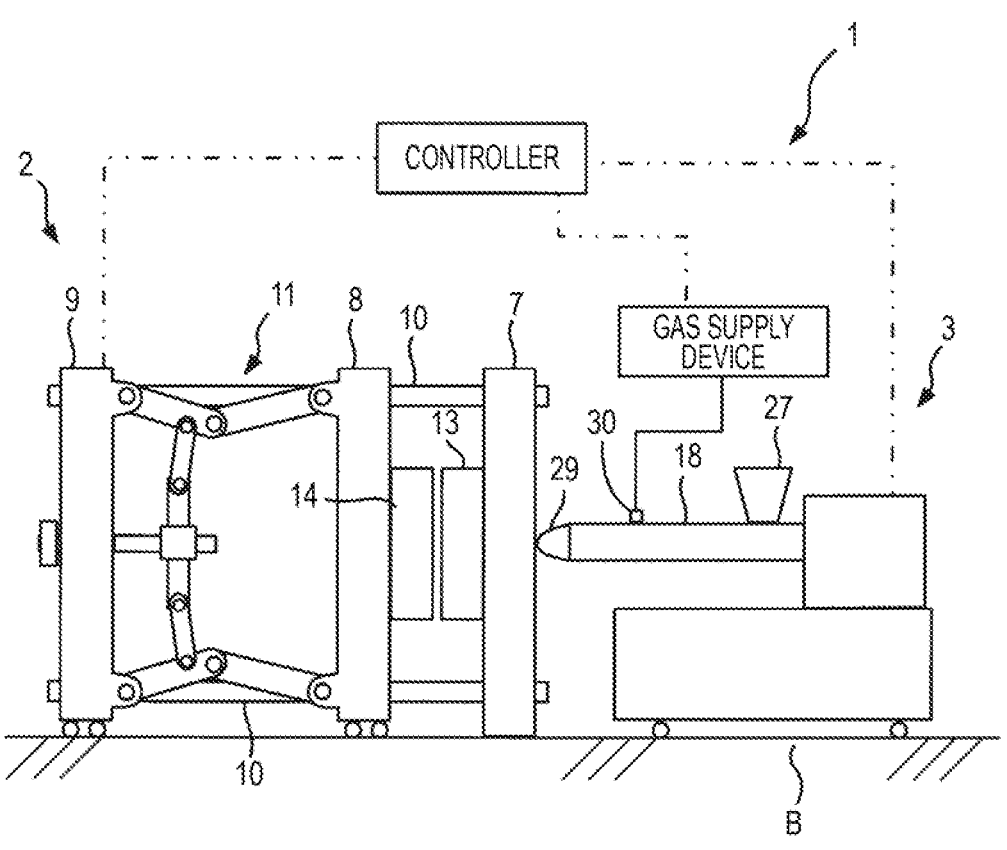
FIG. 1 is a front view showing an injection molding machine according to the present embodiment.

As shown in FIG. 1, an injection molding machine 1 according to the present embodiment includes a mold clamping device 2, an injection device 3, and a gas supply device 5 provided on a bed B. The gas supply device 5 is a characteristic device of the present embodiment and will be described in detail later.
<Mold Clamping Device>

The mold clamping device 2 may be a direct pressure type, and the type of a mechanism that opens and closes a mold is not limited. The mold clamping device 2 according to the present embodiment is of a toggle type. That is, the mold clamping device 2 includes a fixed platen 7, a movable platen 8, a mold clamping housing 9, tie bars 10, 10, . . . coupling the mold clamping housing 9 and the fixed platen 7, and a toggle mechanism 11. The mold clamping device 2 includes molds 13 and 14 provided on the fixed platen 7 and the movable platen 8. When the toggle mechanism 11 is driven, the molds 13 and 14 are clamped.
<Injection Device>

The injection device 3 according to the present embodiment is an injection device for foam molding using a physical foaming agent, that is, gas. An appearance of the injection device 3 is shown schematically in FIG. 1 and is shown in cross-section in FIG. 2. The injection device 3 includes a heating cylinder 18 and a screw 19 that is provided in the heating cylinder 18. In the screw 19, a groove depth of a flight changes from upstream toward downstream, and an inside of the heating cylinder 18 is partitioned into a plurality of sections. That is, from upstream, the inside of the heating cylinder 18 is partitioned into a supply section 22 in which a resin is supplied and melted, a first compression section 23 in which the melted resin is compressed, a starvation section 24 in which the groove depth is large and a pressure of the resin decreases, and a second compression section 25. In the heating cylinder 18, a hopper 27 is provided upstream, an injection nozzle 29 is provided at a distal end, and a gas introduction port 30 for introducing a gas into the inside is provided at a position corresponding to the starvation section 24.

The injection molding machine 1 has a controller 31 as shown in FIG. 1. The mold clamping device 2, the injection device 3, and the gas supply device 5 according to the present embodiment to be described later in detail are connected to the controller 31 and are controlled by the controller 31.

4

<Gas Supply Device of Related Art>

Figures 6, 7:
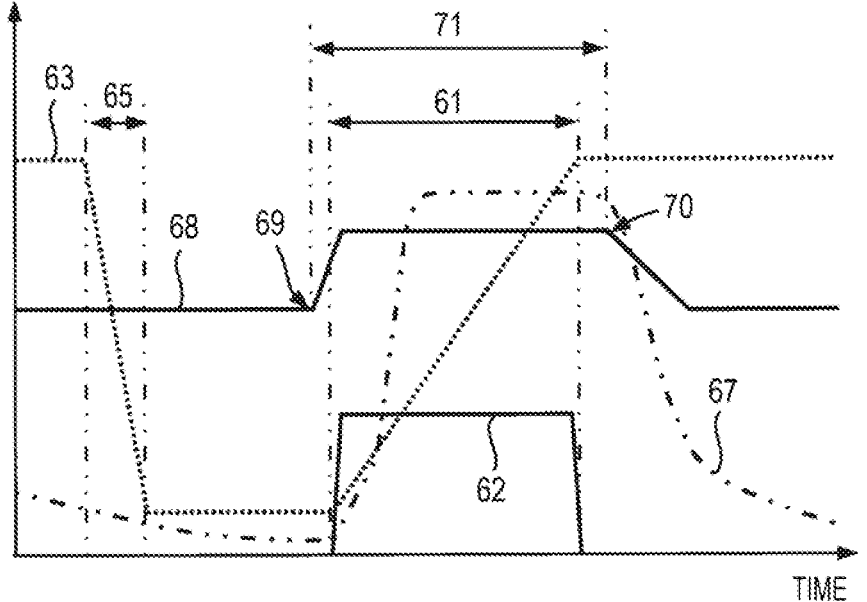
FIG. 6 is a front cross-sectional view of an injection device equipped with a gas supply device of the related art.
FIG. 7 is a graph showing changes in a gas pressure, a screw rotation speed, a screw position, and a gas requirement in a molding cycle when a foam molding method according to the present embodiment is carried out.

Before describing the gas supply device 5 according to the present embodiment, a gas supply device 101 of the related art will be described. The gas supply device 101 of the related art includes a gas supply source, that is, a gas cylinder 102, a pressure reducing valve 103 for reducing a pressure of a high pressure gas supplied from the gas cylinder 102 to a low secondary pressure, a check valve 104 provided as necessary in a pipeline to which the secondary pressure is supplied, and an on-off valve 106 similarly provided as necessary, as shown in FIG. 6. The gas subjected to the secondary pressure is introduced into the heating cylinder 18 from the gas introduction port 30.

A state when the gas is supplied by the gas supply device 101 of the related art to perform a molding cycle of foam molding is shown in a graph of FIG. 9. In the metering process 110 of the molding cycle, a screw rotation speed 111 is a predetermined rotation speed, the resin is metered, and a screw position 112 retreats substantially linearly in the metering process 110. When the metering process 110 is completed, the screw rotation speed 111 becomes zero and the screw position 112 becomes constant.

In the metering process 110, the resin is fed from upstream, supplied with the gas in the starvation section 24, and fed to downstream. In the metering process, the gas is fed to downstream while being gradually dissolved in the resin flowing from upstream. Therefore, a large amount of gas is temporarily consumed, and a gas pressure 114 temporarily decreases in the metering process 110. The pressure of the gas supplied from the gas cylinder 102 should be reduced by the pressure reducing valve 103 and controlled to a constant secondary pressure. However, since the gas flows through a pipe at a high speed so as to compensate for a large amount of the gas temporarily consumed, a pressure loss occurs, and thus the gas pressure 114 temporarily decreases. The amount of gas required by the resin is shown in a graph 115, and a large amount of gas is required in the metering process 110. The pressure temporarily reduced in the metering process 110 is, for example, 0.2 MPa to 0.3 MPa, and the amount of gas melted in the resin is reduced accordingly. Since a large molding machine consumes a large amount of gas, a decrease in gas pressure may be further greater. The gas supply device 5 according to the present embodiment is configured to prevent this phenomenon.
<Gas Supply Device According to First Embodiment>

Although the gas supply device 5 according to the present invention can adopt various embodiments, first, a gas supply device 5A according to a first embodiment shown in FIG. 2 will be described. The gas supply device 5A includes gas cylinders 33, 33 as gas supply sources, and a gas pressure regulating unit 34 configured to regulate a pressure of a gas supplied from the gas supply source. The gas pressure regulating unit 34 is provided with a configuration that is not provided in the gas supply device 101 of the related art. That is, a high pressure regulating unit 36 for regulating a gas pressure to a high pressure and a low pressure regulating unit 37 for regulating a gas pressure to a low pressure are provided.

The high pressure regulating unit 36 includes a high pressure reducing valve 38 that reduces a supply source pressure, which is a pressure of a high pressure gas supplied from the gas cylinder 33. A pipeline downstream of the high pressure reducing valve 38 is branched, and the branched portion configures the low pressure regulating unit 37. The low pressure regulating unit 37 is provided with a low pressure reducing valve 39. The pressure of the gas supplied at the supply source pressure is reduced by the high pressure reducing valve 38 and is further reduced by the low pressure reducing valve 39. The pressure reduced by the high pressure reducing valve 38 is lower than the supply source pressure but higher than a low pressure which is the pressure reduced by the low pressure reducing valve 39, and thus the gas pressure is expressed as a high pressure in the specification.

In the high pressure regulating unit 36, a high pressure-side check valve 41 and a high pressure-side on-off valve 44 are provided in the pipeline downstream of the high pressure reducing valve 38. Also in the low pressure regulating unit 37, a low pressure-side check valve 42 and a low pressure-side on-off valve 45 are provided in a pipeline downstream of the low pressure reducing valve 39. Although not shown in FIG. 2, these on-off valves 44 and 45 are operated by the controller 31 (see FIG. 1). The pipelines downstream of the high pressure-side on-off valve 44 and the low pressure-side on-off valve 45 are merged and connected to the gas introduction port 30.

In the gas supply device 5A according to the first embodiment, a supply source pressure gauge 47 for detecting a supply source pressure of the gas is provided in a pipe to which the gas cylinders 33 and 33 are connected. The high pressure regulating unit 36 is provided with a high pressure gauge 48 for detecting a high pressure gas. The low pressure regulating unit 37 is provided with a low pressure gauge 49 for detecting a low pressure gas. An injection pressure gauge 51 for detecting a pressure of an introduced gas is provided in the pipeline connected to the gas introduction port 30.

In the gas supply device 5A according to the first embodiment, the high pressure reducing valve 38 and the low pressure reducing valve 39 are set in advance such that high and low gas pressures regulated respectively by the high pressure reducing valve 38 and the low pressure reducing valve 39 become desired pressures. Therefore, the gas pressure of the gas supplied from the gas introduction port 30 into the heating cylinder 18 becomes a high pressure when the low pressure-side on-off valve 45 is closed and the high pressure-side on-off valve 44 is opened, and becomes a low pressure when the low pressure-side on-off valve 45 is opened and the high pressure-side on-off valve 44 is closed. In the embodiment, the low pressure-side on-off valve 45 is not always essential. This is because the low pressure-side check valve 42 is provided, and thus the high pressure gas does not flow back to the low pressure regulating unit 37. That is, in the present embodiment, any one of the low pressure-side on-off valve 45 and the check valve 42 may be used. The same applies to the following embodiments when the high pressure regulating unit 36 and the low pressure regulating unit 37 are included.

<Foam Molding Method According to Present Embodiment>

A foam molding method performed by the injection molding machine 1 according to the present embodiment equipped with the gas supply device 5A according to the first embodiment is, in short, a method of actively changing a gas pressure in a molding cycle. Specifically, the gas pressure is increased in the metering process and decreased in the other processes. In the metering process, since the resin flows from upstream to downstream in the heating cylinder 18, the gas does not flow back in the heating cylinder 18. Since the pressure of the gas is increased to a high pressure in the metering process, a large amount of gas can be efficiently dissolved in the resin. When the metering process is completed, the flow of the resin in the heating cylinder 18 is stopped, so that the gas may flow back. At this time, the backflow can be prevented by reducing the pressure of the gas to a low pressure. The foam molding method will be further described with reference to FIGS. 2 and 7.

FIG. 7 shows changes in various data in the molding cycle. First, the screw rotation speed 62 is a constant rotation speed in the metering process 61 of the molding cycle, and becomes zero in other processes. The screw position 63 rapidly decreases in an injection process 65, then remains substantially constant, gradually increases in the metering process 61, and becomes constant after completion of the metering process 61.

Incidentally, the gas is introduced from the gas introduction port 30. That is, the resin is injected into the starvation section 24. A large amount of gas is dissolved in a resin in which the amount of dissolved gas is zero or small, and only a small amount of gas is dissolved in a resin in which the gas is sufficiently dissolved. In the metering process 61, a new resin in which the gas is not dissolved continuously flows from upstream in the heating cylinder 18, and thus the gas consumption amount is large. On the other hand, in other processes in which the resin does not flow in the heating cylinder 18, the gas consumption amount decreases. That is, a gas requirement changes. A graph denoted by reference numeral 67 shows a change in the gas requirement in the molding cycle.

In the foam molding method according to the present embodiment, when the gas requirement 67 is large, the gas is supplied at a high pressure, and when the gas requirement 67 is small, the gas is supplied at a low pressure. A graph denoted by reference numeral 68 shows a change in gas pressure. In the processes other than the metering process 61, in the gas supply device 5A according to the first embodiment, the controller 31 opens the low pressure-side on-off valve 45 and closes the high pressure-side on-off valve 44 to supply a low pressure gas. Prior to the start of the metering process 61, the controller 31 closes the low pressure-side on-off valve 45 and opens the high pressure-side on-off valve 44 at a timing denoted by reference numeral 69 to supply a high pressure gas. A gas pressure 68 rapidly changes to a high pressure. That is, the gas pressure increases. Accordingly, a large amount of gas can be efficiently introduced into the resin. This is because a gas dissolution amount and a gas dissolution rate are proportional to the gas pressure. That is, the gas dissolution amount is controlled by the gas pressure.

After completion of the metering process 61, the controller 31 opens the low pressure-side on-off valve 45 and closes the high pressure-side on-off valve 44 after a predetermined specified time to switch to supply of a low pressure gas. The timing is denoted by reference numeral 70. That is, the gas pressure is decreased. The pressure of the gas gradually decreases. Thereafter, the gas pressure is stabilized at a low pressure. Accordingly, the backflow of the gas is prevented. When the pressure is excessively reduced, the gas dissolved in the resin during a pressure increasing period 71 is separated from the resin and starts foaming, but the foaming in the heating cylinder 18 can be prevented by maintaining the gas pressure at a low pressure. Incidentally, in the foam molding method according to the present embodiment, a period in which the gas pressure is high, that is, the pressure increasing period 71, includes the metering process 61, and is slightly longer than that.

The present embodiment is not limited thereto. For example, when the metering time is extremely short in high-cycle molding or the like, the gas supply may be stopped instead of switching to a low pressure gas. This is because the cycle is short, and thus the pressure decreases substantially less, and the same effect as that of switching to a low pressure can be obtained. In this case, the low pressure regulating unit 37 is not necessarily required, and the gas supply device 5 may be configured only by the high pressure regulating unit 36.

<Gas Supply Device According to Second Embodiment>

Figure 3:
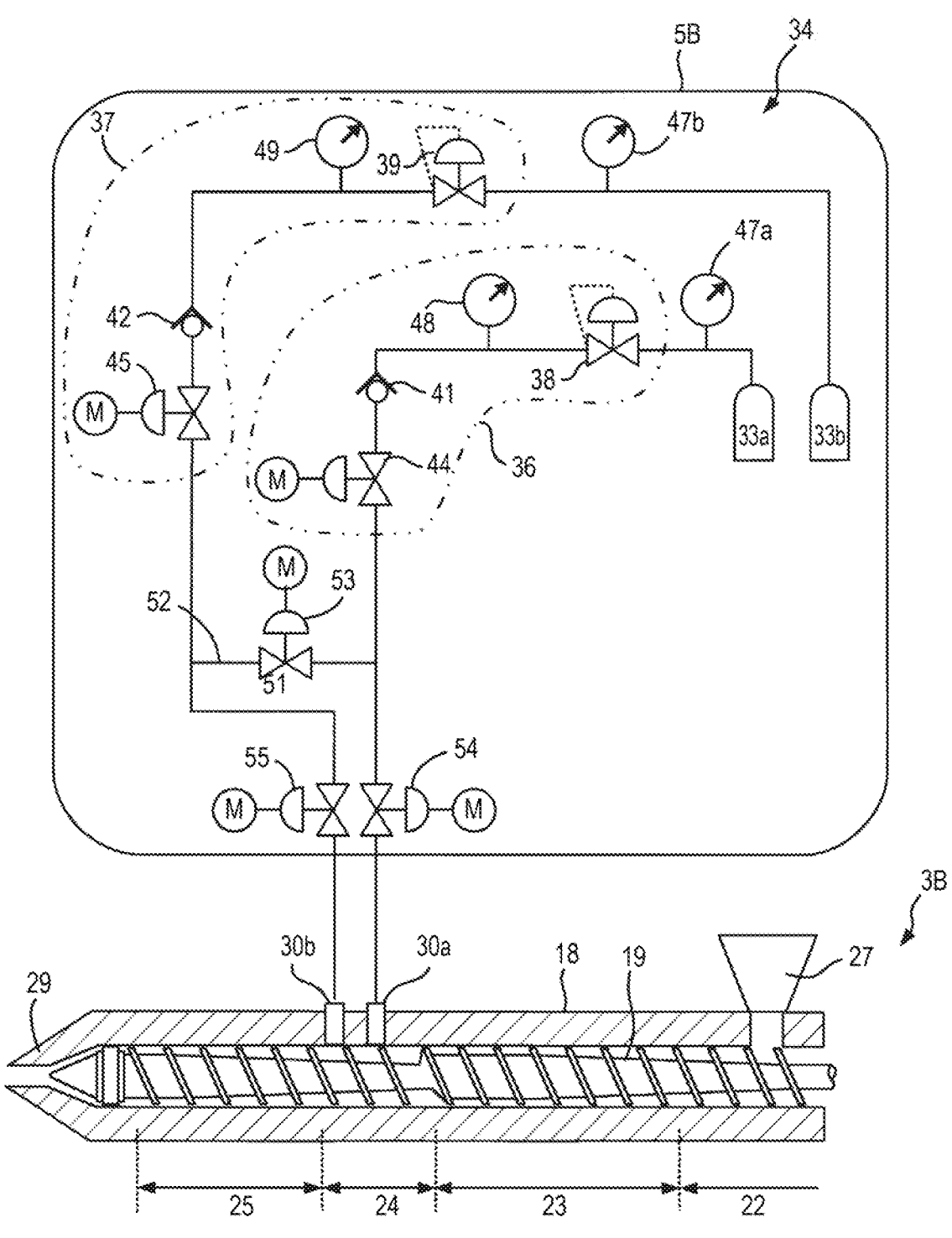
FIG. 3 is a front cross-sectional view of an injection device equipped with a gas supply device according to a second embodiment.

The gas supply device 5 can be variously modified. FIG. 3 shows a gas supply device 5B according to a second embodiment. Parts and components similar to those of the first embodiment are denoted by the same reference numerals, and description thereof will be omitted. An injection device 3B according to the embodiment is provided with two gas introduction ports, that is, first and second gas introduction ports 30a and 30b. The gas supply device 5B according to the second embodiment introduces a gas into the first and second gas introduction ports 30a and 30b.

As in the first embodiment, the gas supply device 5B according to the second embodiment is also provided with the high pressure regulating unit 36 and the low pressure regulating unit 37, but these are completely separated into two systems from upstream. That is, gas cylinders 33a and 33b are separately provided corresponding to the high pressure regulating unit 36 and the low pressure regulating unit 37, and the respective supply source pressure gauges 47a and 47b are provided. A pipeline from the high pressure regulating unit 36 and a pipeline from the low pressure regulating unit 37 are connected to the first gas introduction port 30a and the second gas introduction port 30b, respectively.

However, a bypass pipe 52 is provided midway between the pipeline from the high pressure regulating unit 36 and the pipeline from the low pressure regulating unit 37, and a bypass on-off valve 53 is provided in the bypass pipe 52. A first on-off valve 54 is provided downstream of the bypass pipe 52 in the pipeline from the high pressure regulating unit 36, and a second on-off valve 55 is provided downstream of the bypass pipe 52 in the pipeline from the low pressure regulating unit 37.

The gas supply device 5B according to the second embodiment can be operated by various methods. When the gas supply device 5B is operated with the bypass on-off valve 53 normally closed in the molding cycle, a high pressure gas is normally introduced into the heating cylinder 18 only from the first gas introduction port 30a, and a low pressure gas is normally introduced into the heating cylinder 18 only from the second gas introduction port 30b. In the metering process 61, the controller 31 opens the high pressure-side on-off valve 44 and the first on-off valve 54 to supply a high pressure gas. In other processes, the controller 31 closes the on-off valves 44 and 54 and opens the low pressure-side on-off valve 45 and the second on-off valve 55 to supply a low pressure gas.

When the gas supply device 5B is operated with the bypass on-off valve 53 normally open, a high pressure gas and a low pressure gas can be supplied to both the first and second gas introduction ports 30a and 30b. That is, when the high pressure-side on-off valve 44 is opened and the low pressure-side on-off valve 45 is closed, a high pressure gas is supplied, and when the high pressure-side on-off valve 44 is closed and the low pressure-side on-off valve 45 is opened, a low pressure gas is supplied. Depending on an opened or closed state of the first and second on-off valves 54 and 55, the gas can be introduced into both of the first and second gas introduction ports 30a and 30b at the same time or introduced into any one of the first and second gas introduction ports 30a and 30b. In the injection molding machine 1, since the screw 19 moves in an axial direction during the metering process, the gas introduction ports 30a and 30b may deviate from the starvation section 24 depending on the configuration and position of the screw 19 and the arrangement of the gas introduction ports 30a and 30b. Even in such a case, by arranging the gas introduction ports 30a and 30b apart from each other in the axial direction and selecting one of the first and second on-off valves 54 and 55 to be opened according to the screw position, it is possible to continue to supply the gas to an appropriate position of the starvation section 24.

In the present embodiment, various modifications are possible. Instead of using the bypass on-off valve 53 in a normally opened state, the bypass on-off valve 53 may be eliminated and the bypass pipe 52 may be used. Or, instead of using the bypass on-off valve 53 in a normally closed state, the bypass pipe 52 may be eliminated. In the case the bypass pipe 52 is eliminated, the first and second on-off valves 54 and 55 may be eliminated.

<Gas Supply Device According to Third Embodiment>

Figure 4:
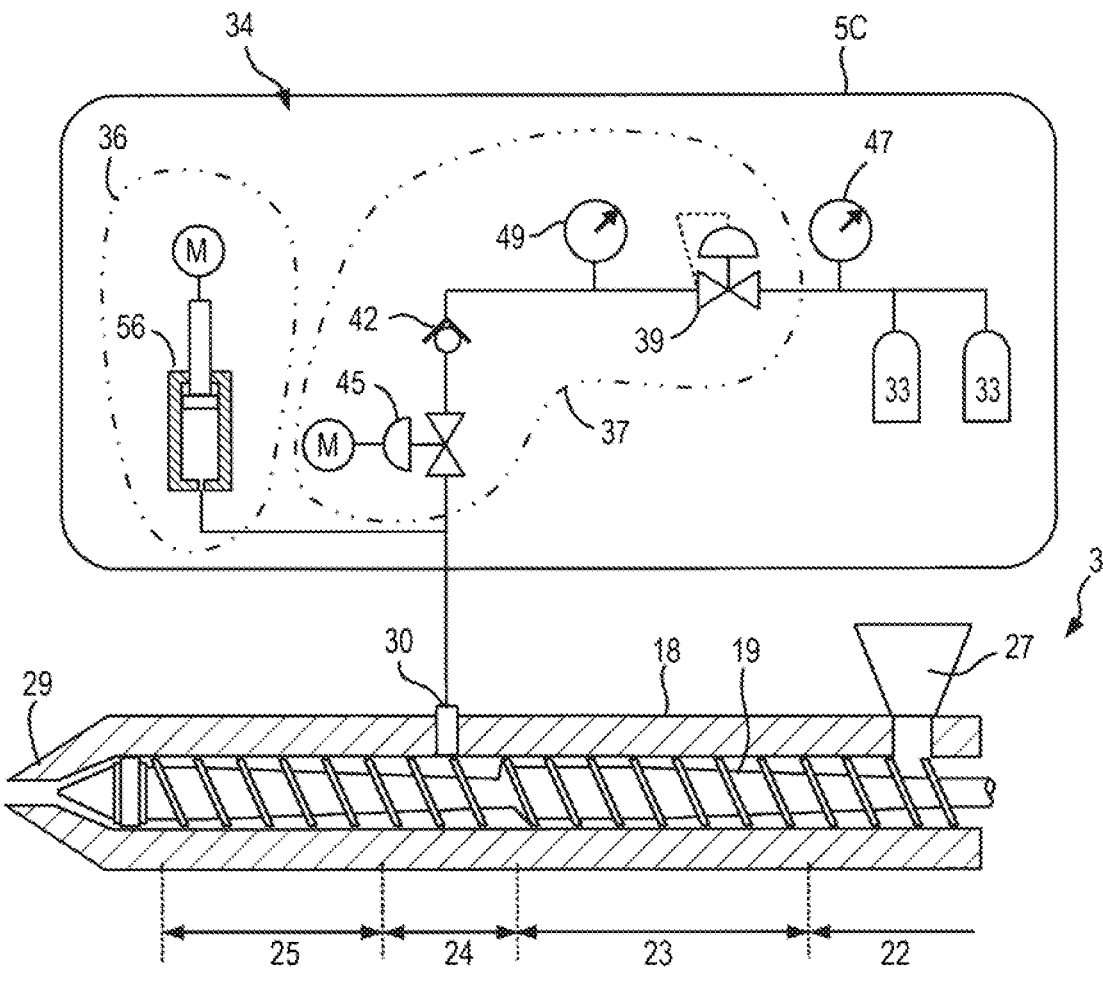
FIG. 4 is a front cross-sectional view of an injection device equipped with a gas supply device according to a third embodiment.

FIG. 4 shows a gas supply device 5C according to a third embodiment. Parts and components similar to those of the first embodiment are denoted by the same reference numerals, and description thereof will be omitted. In the gas supply device 5C according to the third embodiment, the high pressure regulating unit 36 includes a syringe 56 driven by a high pressure piston, and is connected downstream of the low pressure regulating unit 37. The syringe 56 can store a sufficient amount of low pressure gas, and when the piston is driven, the syringe 56 is compressed to supply a high pressure gas. That is, the syringe 56 is a pressure increasing mechanism for increasing a pressure of a gas. Therefore, in the metering process 61, the controller 31 may supply the high pressure gas by driving the syringe 56 to increase the pressure of the gas after closing the low pressure-side on-off valve 45.

The gas pressure control means of the pressure increasing mechanism is not particularly limited, and for example, the pressure may be calculated and controlled from a driving force of the piston and a cross-sectional area of the piston, or the pressure may be feedback-controlled by attaching a pressure gauge downstream of the piston.

<Gas Supply Device According to Fourth Embodiment>

Figure 5:
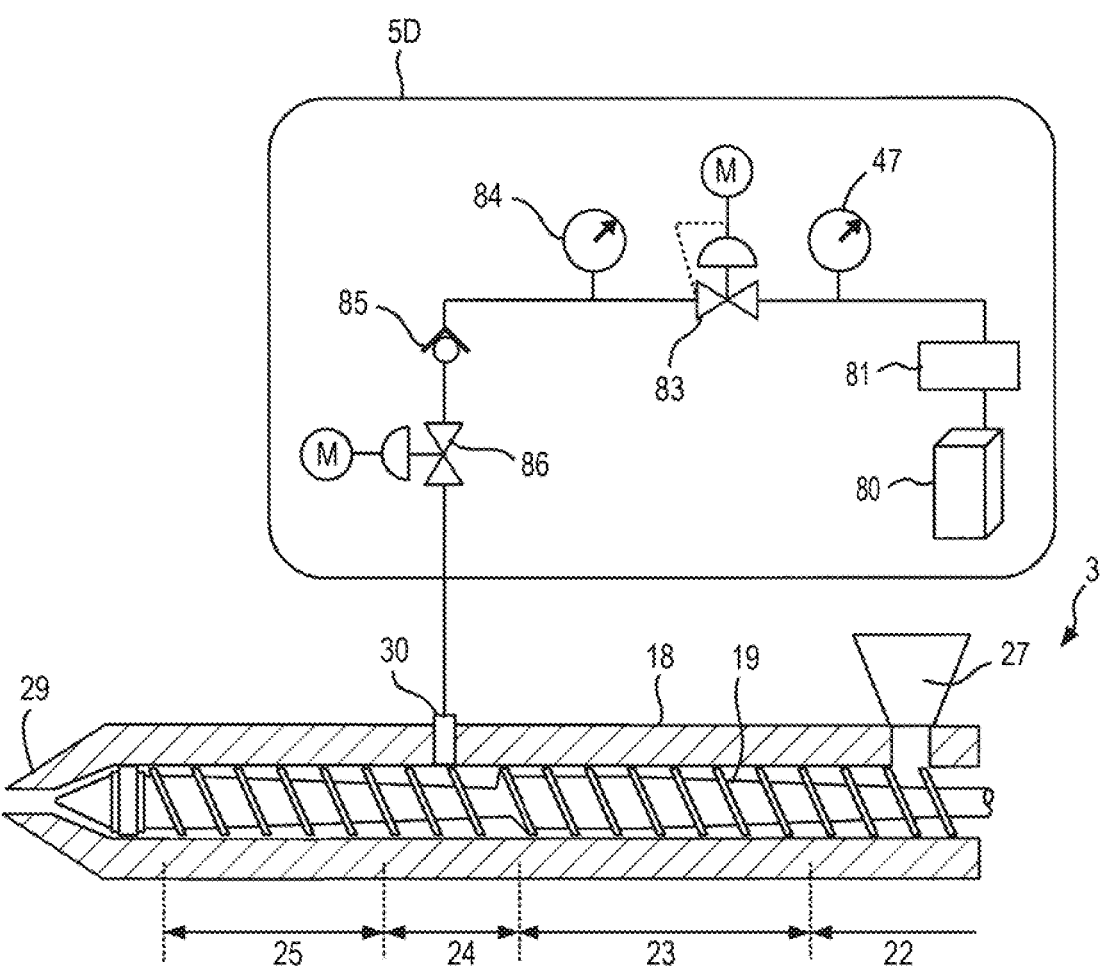
FIG. 5 is a front cross-sectional view of an injection device equipped with a gas supply device according to a fourth embodiment.

FIG. 5 shows a gas supply device SD according to a fourth embodiment. Parts and components similar to those of the first embodiment are denoted by the same reference numerals, and description thereof will be omitted. The gas supply device SD according to the fourth embodiment includes a nitrogen gas generator 80 as a gas supply source and a booster pump 81 for compressing a gas. A pressure reducing valve 83 with an automatic pressure regulating function is provided in a pipeline from the gas supply source. The pressure reducing valve 83 can change a set pressure according to a command from the controller 31 (see FIG. 1). A pressure gauge 84, a check valve 85, and an on-off valve 86 are provided downstream of the pressure reducing valve 83, and are connected to the gas introduction port 30. In the metering process, the gas is supplied at a high pressure in the pressure reducing valve 83 with an automatic pressure regulating function, and in other processes, the gas is supplied at a low pressure.

<Foam Molding Method According to Other Embodiments>

When the operation is performed by the gas supply device 5C according to the third embodiment or the gas supply device SD according to the fourth embodiment, it is also possible to supply the gas with three or more stages of pressure such as high pressure, medium pressure, and low pressure. FIG. 8 shows a change in each data in a foam molding method in which a gas is supplied by changing a gas pressure in three stages. That is, a pressure increasing period includes a pressure increasing period 71*a* in which the gas pressure 68 is a medium pressure, and a pressure increasing period 71*b* in which the gas pressure 68 is a high pressure. The gas pressure 68 is switched from the low pressure to the medium pressure at a timing 69*a* prior to the metering process 61. Next, after the metering process 61 is started, the pressure of the gas is switched from the medium pressure to the high pressure at a timing 69*b*. When the high pressure is switched to the low pressure at a timing denoted by reference numeral 70 slightly before the metering process 61 is completed, the gas pressure 68 thereafter gradually changes to the low pressure. Further, the gas pressure 68 may be smoothly increased or decreased. That is, the pressure may be gradually increased during the metering process 61. In the first and second embodiments, a modification is also possible in which a pressure increasing mechanism is provided in the high pressure regulating unit 36, and the pressure is adjusted in three or more stages during the metering process 61.

<Other Modifications>

The injection molding machine 1 according to the present embodiment and the foam molding method according to the present embodiment can be variously modified. For example, the pipeline from the gas supply device 5 is described as being directly connected to the gas introduction port 30, but a small volume buffer may be provided in the vicinity of the gas introduction port 30. The buffer serves as a cushion to prevent a rapid change in gas pressure. However, in order to obtain a maximum effect in the present invention, it is desirable to provide the buffer between the high pressure-side check valve 41 and the high pressure-side on-off valve 44 of the high pressure regulating unit 36. This is because, if the buffer is provided downstream of the high pressure-side on-off valve 44, that is, in the vicinity of the gas introduction port 30, when the pressure is switched to a high pressure or a low pressure, it takes time to switch the pressure due to a buffering action of the buffer. On the other hand, when the buffer is provided in the high pressure regulating unit 36, it is possible to prevent a pressure decrease in the high pressure regulating unit 36 immediately after the high pressure-side on-off valve 44 is opened and the pressure is switched from the low pressure to the high pressure, and to rapidly increase the pressure in the heating cylinder 18.

For example, in the gas supply device 5A according to the first embodiment, as described above, the low pressure-side check valve 42 may be omitted, or the check valves 41 and 42 may be omitted instead of omitting the low pressure-side check valve 42.

Figure 2:
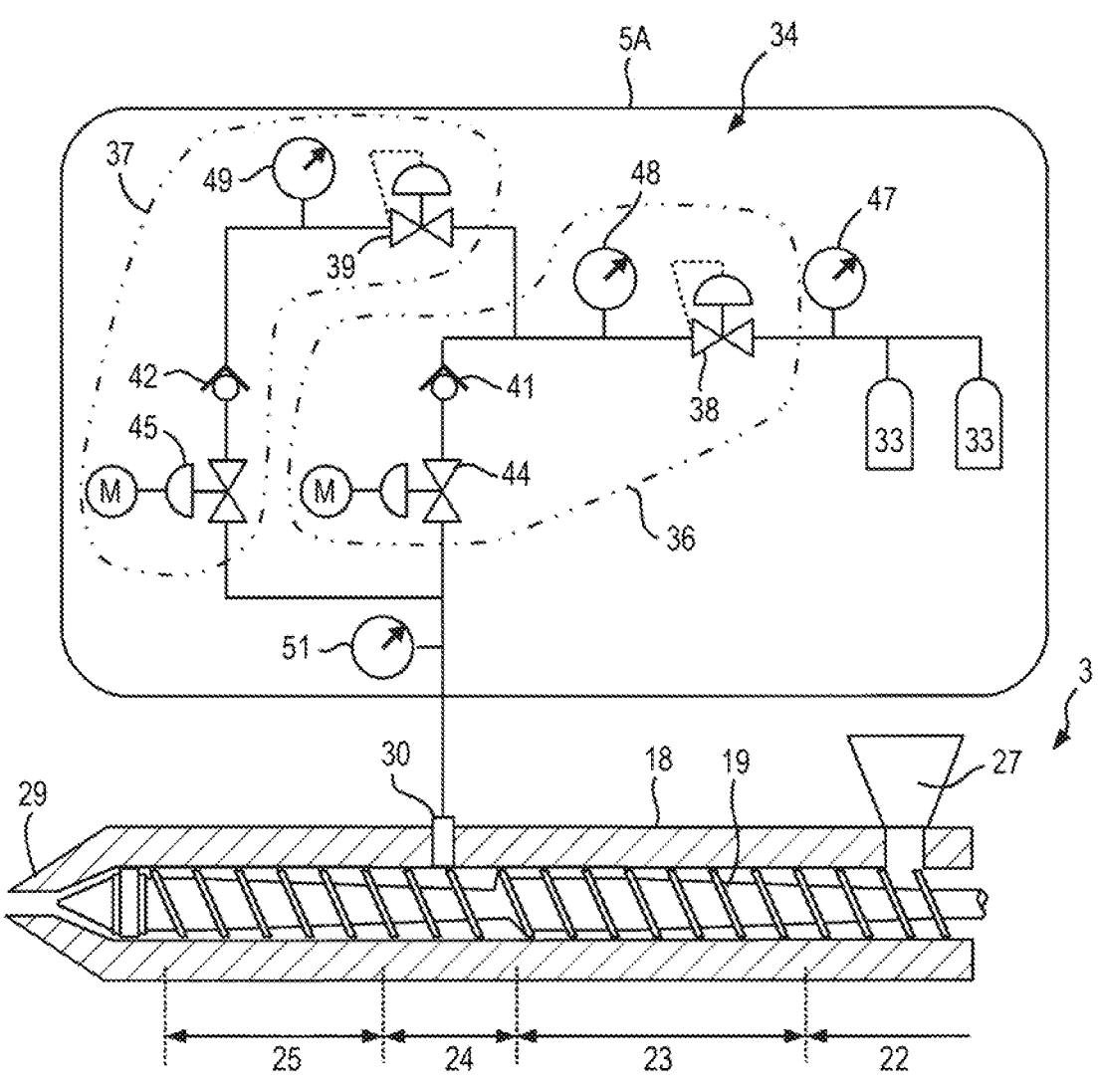
FIG. 2 is a front cross-sectional view of an injection device having a gas supply device according to a first embodiment.

The gas supply device 5A shown in FIG. 2 and the gas supply device 5C shown in FIG. 4 may be combined with the injection device 3B having a configuration in which two gas introduction ports are provided, as shown in FIG. 3. In this case, the pipe from the gas supply device is branched into two to reach each of the two gas introduction ports. In the gas supply device 5B shown in FIG. 3, the bypass on-off valve 53 may not be provided.

In the foam molding method, it has been described that the pressure of the gas is increased to a high pressure prior to the metering process 61, but the pressure of the gas may be increased simultaneously with the start of the metering process 61 or with a delay from the start of the metering process 61. The pressure increasing period 71 in which the pressure of the gas increases in the molding cycle may at least partially overlap with the metering process 61. In the processes other than the metering process 61, it has been described that the gas is set to a low pressure, that is, the pressure of the gas is reduced, but the supply of the gas may be stopped. When the pressure is excessively decreased, the gas dissolved in the resin during the pressure increasing period 71 in the heating cylinder 18 is separated and starts to foam, and thus the pressure of the gas needs to be maintained to such an extent that foaming does not occur.

Although the invention made by the present inventors is specifically described based on the embodiment, it is needless to say that the present invention is not limited to the embodiment described above, and various modifications can be made without departing from the scope of the invention. A plurality of examples described above may be implemented in combination as appropriate.

Here, features of the embodiments of the gas supply device, the injection molding machine, and the foam molding method according to the present invention described above will be briefly summarized and listed [1] to [26] below:

[1]

A gas supply device (5) provided in an injection device (3), the injection device including a heating cylinder (18) having a gas introduction port (30) and a screw (19) provided to be drivable in the heating cylinder (18), the gas supply device (5) including:

a gas supply source (102); and a gas pressure regulating unit (34) configured to regulate a pressure of a gas from the gas supply source (102) and supply the gas to the gas introduction port (30), in which the gas pressure regulating unit (34) is configured to change a gas pressure in a molding cycle and to cause a pressure increasing period in which the gas pressure increases to at least partially overlap with a metering process.

[2]

The gas supply device (5) according to [1], in which the gas pressure regulating unit (34) is configured to reduce the gas pressure at a specified time before, at the time of, or after a specified time from completion of the metering process of the molding cycle.

[3]

The gas supply device (5) according to [1] or [2], in which the gas pressure regulating unit (34) is configured to switch the gas pressure in two or more stages in the molding cycle.

[4]

The gas supply device (5) according to any one of [1] to [3], in which the gas supply source (102) includes one or more gas cylinders (33).

[5]

The gas supply device (5) according to any one of [1] to [4], in which two or more of the gas introduction ports (30) are provided in the heating cylinder (18).

[6]

The gas supply device (5) according to any one of [1] to [5], in which the gas pressure regulating unit (34) includes one or more pressure reducing valves (38, 39).

[7]

The gas supply device (5) according to any one of [1] to [6], in which the gas pressure regulating unit (34) includes at least: a high pressure regulating unit (36) configured to regulate the gas pressure to a high pressure; and a low pressure regulating unit (37) configured to regulate the gas pressure to a low pressure.

[8]

The gas supply device (5) according to any one of [1] to [7], in which the high pressure regulating unit (36) includes a buffer.

[9]

The gas supply device (5) according to any one of [1] to [8], in which the gas pressure regulating unit (34) includes a pressure increasing mechanism (56) configured to increase the gas pressure.

[10]

An injection molding machine (1) including:

a mold clamping device (2) configured to clamp molds (13, 14); and an injection device (3) configured to inject a resin, the injection device (3) including:

a heating cylinder (18) having a gas introduction port (30); and a screw (19) provided to be drivable in the heating cylinder (18); and a gas supply device (5) including:

a gas supply source (102); and a gas pressure regulating unit (34) configured to regulate a pressure of a gas from the gas supply source (102) to supply the gas to the gas introduction port (30), and in which the gas pressure regulating unit (34) is configured to change a gas pressure in a molding cycle and to cause a pressure increasing period in which the gas pressure increases to at least partially overlap with a metering process.

[11]

The injection molding machine (1) according to [10], in which the gas pressure regulating unit (34) is configured to reduce the gas pressure at a specified time before, at the time of, or after a specified time from completion of the metering process of the molding cycle.

[12]

The injection molding machine (1) according to [10] or [11], in which the gas pressure regulating unit (34) switches the gas pressure in two or more stages in the molding cycle.

[13]

The injection molding machine (1) according to any one of [10] to [12], in which the gas supply source (102) includes one or more gas cylinders (33).

[14]

The injection molding machine (1) according to any one of [10] to [13], in which two or more of the gas introduction ports (30) are provided in the heating cylinder (18).

[15]

The injection molding machine (1) according to any one of [10] to [14], in which the gas pressure regulating unit (34) includes one or more pressure reducing valves (38, 39).

[16]

The injection molding machine (1) according to any one of [10] to [15], in which the gas pressure regulating unit (34) includes at least: a high pressure regulating unit (36) configured to regulate the gas pressure to a high pressure; and a low pressure regulating unit (37) configured to regulate the gas pressure to a low pressure.

[17]

The injection molding machine (1) according to any one of [10] to [16], in which the high pressure regulating unit (36) includes a buffer.

[18]

The injection molding machine (1) according to any one of [10] to [17], in which the gas pressure regulating unit (34) includes a pressure increasing mechanism (56) configured to increase the gas pressure.

[19]

A foam molding method for obtaining a foam molded product in an injection molding machine (1), the injection molding machine (1) including a heating cylinder (18) having a gas introduction port (30), a screw (19) provided to be drivable in the heating cylinder (18), and a gas supply source (102), the foam molding method including:

supplying a gas from the gas supply source (102) to the heating cylinder (18) from the gas introduction port (30) with regulating a pressure by gas pressure regulation processing, in which the gas pressure regulation processing includes changing a gas pressure in a molding cycle and causing a pressure increasing period in which the gas pressure increases to at least partially overlap with a metering process.

[20]

The foam molding method according to [19], in which the gas pressure regulation processing includes reducing the gas pressure at a specified time before, at the time of, or after a specified time from completion of the metering process of the molding cycle.

[21]

The foam molding method according to [19] or [20], in which the gas pressure regulation processing includes switching the gas pressure in two or more stages in the molding cycle.

[22]

The foam molding method according to any one of [19] to [21], in which the gas supply source (102) includes one or more gas cylinders (33).

[23]

The foam molding method according to any one of [19] to [22], in which two or more of the gas introduction ports (30) are provided in the heating cylinder (18).

[24]

The foam molding method according to any one of [19] to [23], in which the gas pressure regulation processing includes regulating the gas pressure by one or more pressure reducing valves (38, 39).

[25]

The foam molding method according to any one of [19] to [24], in which the gas pressure regulation processing includes at least high pressure regulation processing for regulating the gas pressure to a high pressure and low pressure regulation processing for regulating the gas pressure to a low pressure.

[26]

The foam molding method according to any one of [19] to [25], in which the gas pressure regulation processing includes pressure increasing processing for increasing the gas pressure.

INDUSTRIAL APPLICABILITY

According to the present invention, the gas pressure is changed by the gas pressure regulating unit of the gas supply device, and the pressure increasing period in which the gas pressure increases overlaps the metering process. Accordingly, when the resin is fed from upstream to downstream in the metering process, the high pressure gas is supplied to the resin, and thus the gas is efficiently dissolved in the resin. At this time, since the resin flows from upstream to downstream, the backflow of the gas hardly occurs. The present invention having the effect is useful for a gas supply device, an injection molding machine, and a foam molding method.

REFERENCE SIGNS LIST

1 Injection molding machine
2 Mold clamping device
3 Injection device
5 Gas supply device
18 Heating cylinder
19 Screw
22 Supply section
23 First compression section
24 Starvation section
25 Second compression section
30 Gas introduction port
31 Controller
33 Gas cylinder
34 Gas pressure regulating unit
36 High pressure regulating unit
37 Low pressure regulating unit
38 High pressure reducing valve
39 Low pressure reducing valve
41 High pressure-side check valve
42 Low pressure-side check valve
44 High pressure-side on-off valve
45 Low pressure-side on-off valve
47 Supply source pressure gauge
48 High pressure gauge
49 Low pressure gauge
51 Injection pressure gauge
61 Metering process
62 Screw rotation speed
63 Screw position
65 Injection process
67 Gas requirement
68 Gas pressure
71 Pressure increasing period

The invention claimed is:

1. A gas supply device provided in an injection device, the injection device comprising a heating cylinder having a gas introduction port and a screw provided to be drivable in the heating cylinder, the gas supply device comprising:
    a gas supply source;
    a gas pressure regulating device configured to regulate a pressure of a gas from the gas supply source and to supply the gas to the gas introduction port; and
    a controller configured to control the gas pressure regulating device is to actively change a gas pressure at the gas introduction port while continuously supplying gas in a molding cycle and to cause a pressure increasing period in which the gas pressure increases to at least partially overlap with a metering process.

2. The gas supply device according to claim 1, wherein the controller is configured to control the gas pressure regulating device is configured to reduce the gas pressure at a specified time before, at the time of, or after a specified time from completion of the metering process of the molding cycle.

3. The gas supply device according to claim 1, wherein the gas pressure regulating device is configured to switch the gas pressure in two or more stages in the molding cycle.

4. The gas supply device according to claim 1, wherein the gas supply source includes one or more gas cylinders.

5. The gas supply device according to claim 1, wherein two or more of the gas introduction ports are provided in the heating cylinder.

6. The gas supply device according to claim 1, wherein the gas pressure regulating device includes one or more pressure reducing valves.

7. The gas supply device according to claim 1, wherein the gas pressure regulating device includes at least: a high pressure regulating device configured to regulate the gas pressure to a high pressure; and a low pressure regulating device configured to regulate the gas pressure to a low pressure.

8. The gas supply device according to claim 7, wherein the high pressure regulating device includes a buffer.

9. The gas supply device according to claim 1, wherein the gas pressure regulating device includes a pressure increasing mechanism configured to increase the gas pressure.

10. The gas supply device according to claim 1, wherein the controller is configured to control the gas pressure regulating device to reduce the gas pressure at a specified time after the completion of the metering process.

11. The gas supply device according to claim 1, wherein the controller is configured to control the gas pressure regulating device to actively change the gas pressure at the gas introduction port while continuously supplying gas in the molding cycle by changing between a high pressure and a low pressure.

12. An injection molding machine comprising:
    a mold clamping device configured to clamp molds; and
    an injection device configured to inject a resin, the injection device including:
        a heating cylinder having a gas introduction port; and
        a screw provided to be drivable in the heating cylinder; and
    a gas supply device including:
        a gas supply source;
        a gas pressure regulating device configured to regulate a pressure of a gas from the gas supply source to supply the gas to the gas introduction port; and
        a controller configured to control the gas pressure regulating device is to actively change a gas pressure at the gas introduction port while continuously supplying gas in a molding cycle and to cause a pressure increasing period in which the gas pressure increases to at least partially overlap with a metering process.

13. The injection molding machine according to claim 12, wherein the gas pressure regulating device is configured to reduce the gas pressure at a specified time before, at the time of, or after a specified time from completion of the metering process of the molding cycle.

14. The injection molding machine according to claim 12, wherein the gas pressure regulating device is configured to switch the gas pressure in two or more stages in the molding cycle.

15. The injection molding machine according to claim 12, wherein the gas supply source includes one or more gas cylinders.

16. The injection molding machine according to claim 12, wherein two or more of the gas introduction ports are provided in the heating cylinder.

17. The injection molding machine according to claim 12, wherein the gas pressure regulating device includes one or more pressure reducing valves.

18. The injection molding machine according to claim 12, wherein the gas pressure regulating device includes at least: a high pressure regulating device configured to regulate the gas pressure to a high pressure; and a low pressure regulating device configured to regulate the gas pressure to a low pressure.

19. The injection molding machine according to claim 18, wherein the high pressure regulating device includes a buffer.

20. The injection molding machine according to claim 12, wherein the gas pressure regulating device includes a pressure increasing mechanism configured to increase the gas pressure.

\* \* \* \* \*